United States Patent [19]

Close

[11] 4,097,177
[45] Jun. 27, 1978

[54] POWER HEAD DRILLING AND TURNING UNIT

[76] Inventor: Ross A. Close, 3831 Glenbrook Rd., Fairfax, Va. 22031

[21] Appl. No.: 776,637

[22] Filed: Mar. 11, 1977

[51] Int. Cl.² ............................................ B23B 47/18
[52] U.S. Cl. ................................. 408/132; 90/11 A; 173/145
[58] Field of Search ................ 408/136; 408/101, 129, 408/132, 136, 139; 90/11 A, 14; 173/19, 145, 146; 74/841

[56] References Cited

U.S. PATENT DOCUMENTS 3,797,583   3/1974   Quackenbush .................. 173/145 X Primary Examiner—Robert Louis Spruill

[57] ABSTRACT

A drilling and turning power head with an externally threaded spindle adapted to support and feed a tool. The spindle is supported in a cylindrical sleeve by means of bearings and is driven by pulleys and belts from a power axle coupled to a motor. An internally threaded feed hub is mounted on the spindle along with a releasably connected drive hub and both are rotated at different speeds by V-belts from the power axle. Axial feed of the spindle is brought about by the difference in the speed of rotation of the two hubs. Retraction of the spindle is brought about simply by disconnecting the drive hub from the spindle.

1 Claim, 3 Drawing Figures

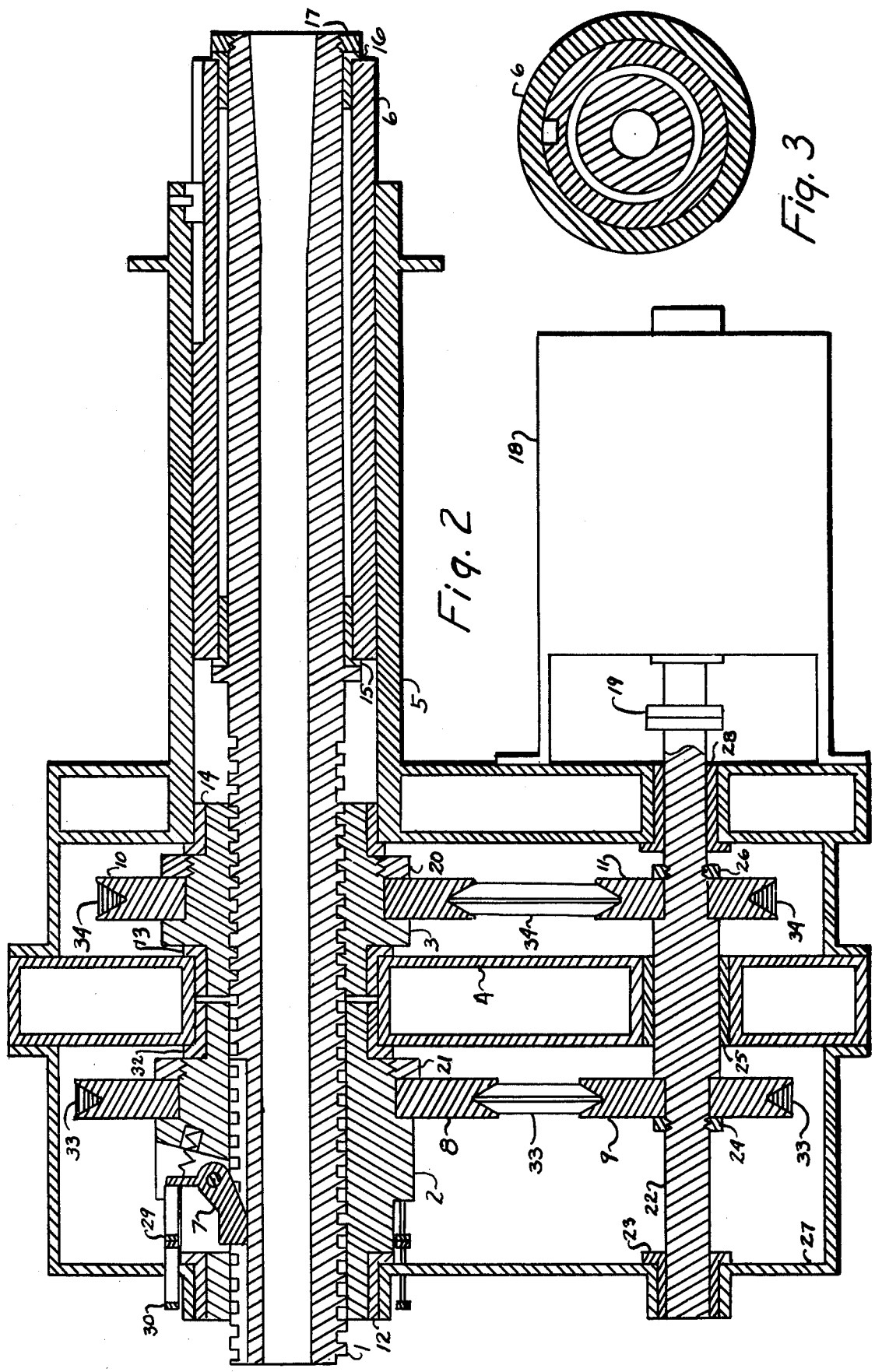

POWER HEAD DRILLING AND TURNING UNIT

BACKGROUND

This invention relates to drilling and turning power heads and more particularly to means for bringing about feed and retraction of a tool holder spindle.

In the preferred form of the invention the new power head consists of concentric parts as follows: guiding sleeve, guiding frame, threaded hub and drive hub. The spindle, threaded hub and drive hub are connected together to form a new concentric mechanical power feed which can be manufactured to compete favorably with other types of power feed.

DESCRIPTION OF DRAWINGS

FIG. 2 is a section through the center line of the spindle and power axle showing the relative positions of the various parts when the unit is partly through a cycle.

FIG. 3 is a section through the spindle at right angles to the axis of the spindle and shows the relative positions of the spindle, guiding sleeve and guiding frame.

DETAILED SPECIFICATIONS

Figure 1:
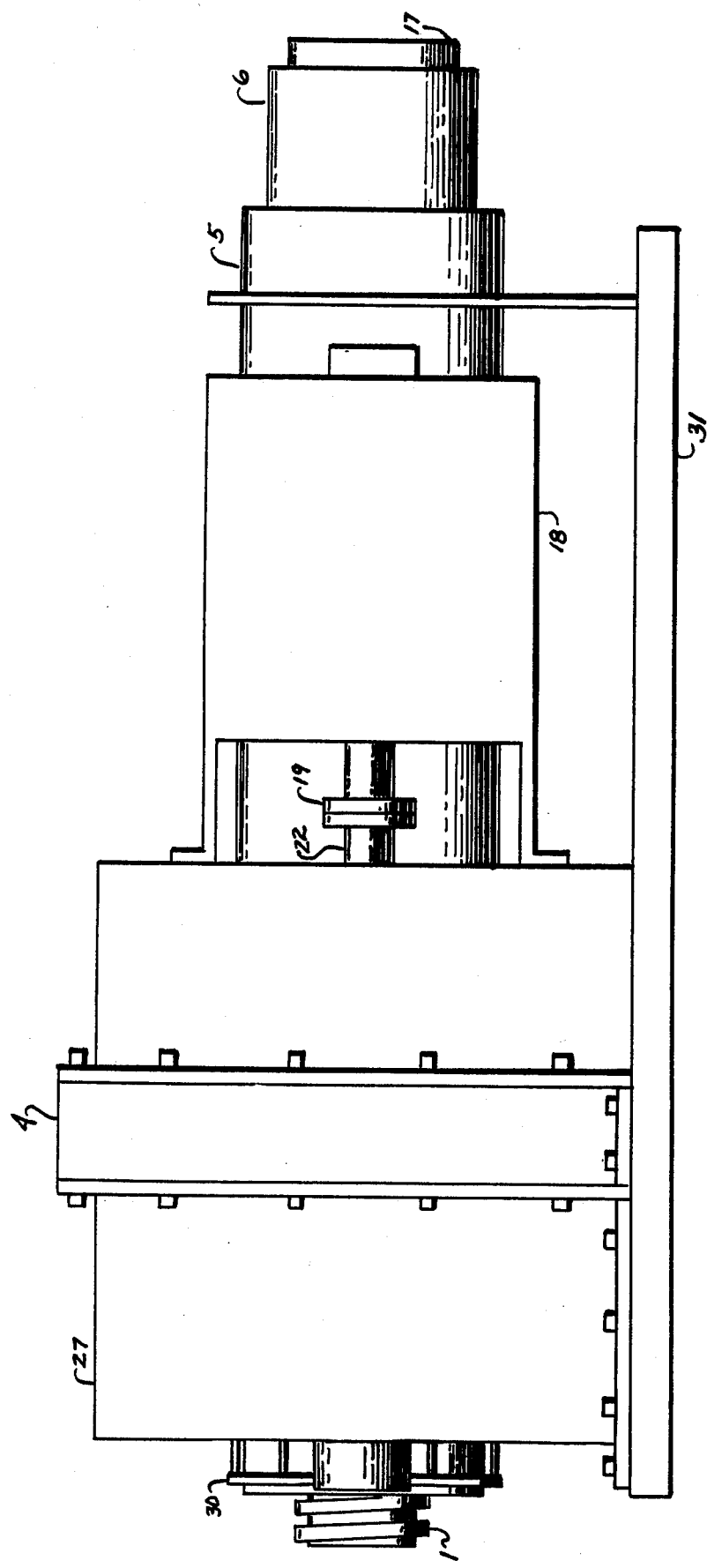
FIG. 1 of the drawings shows a side view of the new power head. Tools and automatic controls are not shown as they are not a part of this invention.

The new power head is built around a new concentric power feed actuated by a difference in speed between the threaded hub and the drive hub.

Parts such as motor 18, coupling 19 and necessary controls are of conventional designs.

The spindle 1 is supported by guiding sleeve 6 through bearings 15 and 16. The spindle is made of high strength steel tubing. The internal surface is fitted to take a standard tool taper so that standard collets and drill chucks can be used by the power head. The end of the spindle 1 opposite the tool end is threaded externally to fit an internal thread on the threaded hub 3. A slot is cut in the spindle 1 to fit dog 7 which is a part of drive hub 2.

The threaded hub 3 is made of high strength steel rod to fit and bear on bearings 13 and 14, internally threaded to fit external thread of spindle 1, and fitted to V-belt pulley 10. The V-belt pulley 10 is held to threaded hub 3 by nut 20.

The drive hub 2 is made of high strength steel rod to fit and bear on bearings 12 and 32, fitted with dog 7 and ring 29. V-belt pulley 8 is attached to drive hub 2 by nut 21.

The guide sleeve 6 is fitted to guiding frame 5 so that spindle 1 and guiding sleeve 6 can move longitudinally along the axis of spindle 1. Guiding sleeve 6 is prevented from rotating by a slot and key.

The power axle 22 is made from steel rod fitted to bear on bearings 23, 25 and 28, attached to motor 18 by coupling 19. V-pulleys 9 and 11 shall be fastened to power axle 22 by nuts 24 and 26.

The operation of this new power head is as follows:

Motor 18 rotates power axle 22 through coupling 19. Spindle 1 is rotated by dog 7 through drive hub 2, through V-pulley 8, V-belt 33, V-pulley 9 by power axle 22. Threaded hub 3 is rotated through V-pulley 10, V-belt 34, V-pulley 11 by power axle 22. The pulley ratios are chosen so that the drive hub 2 rotates faster than the threaded hub 3, therefore spindle 1 is screwed into the threaded hub 3. This action carries spindle 1 coaxially forward to complete the operation. When the operation is completed, the operator presses on ring 30 which releases dog 7 to disconnect drive hub 2 from spindle 1. With power disconnected from the spindle 1 friction between spindle 1 and bearings 15 and 16 causes spindle 1 to cease rotating. Threaded hub 3 continues to rotate and screws spindle 1 back from the tool end. This pulls spindle 1 back to the original position, thus the cycle is completed.

Double ring 30 is attached to support structure 27 by pins and springs around the circumference of the ring. Ring 29 is attached to drive hub 2 by pins and springs around the circumference of ring 29. When the power head is operated ring 29 slides along the inner ring of double ring 30.

When the feed is operating threaded hub 3 presses against bearing 13 which transfers the force through box beam 4 and guiding frame 5 to the base 31.

I claim:

1. A drilling and turning power head comprising
a box beam frame,
a spindle including an externally threaded portion at one end and means to accomodate a work holder at the other end,
means mounting said spindle on said frame for both rotatable and axial movement,
an internally threaded feed hub mounted for rotation on said frame and adapted to cooperate with the externally threaded portion of said spindle to form a thread connection,
a drive hub mounted for rotation on said frame and adapted to be releasably attached to said spindle,
a motor-driven drive shaft rotatably mounted on said frame generally parallel with said spindle,
means including first and second pulleys for drivingly connecting said drive shaft with said feed hub and said drive hub, said means being so adapted that said drive hub is rotated faster than said feed hub to effect axial feed of said spindle, and
means including a ring actuated dog for disconnecting said drive hub from said spindle so that continued rotation of said feed hub will cause the threaded connection between said feed hub and said spindle to reverse the feed and retract the spindle.

* * * * *